Jan. 22, 1963 W. E. ROWE 3,074,145

SEMICONDUCTOR DEVICES AND METHOD OF MANUFACTURE

Filed Aug. 14, 1959 5 Sheets-Sheet 1

INVENTOR.
William E. Rowe

BY Amster & Levy
Attorneys

INVENTOR.
William E. Rowe
BY
Amster + Levy
Attorneys

INVENTOR.
William E. Rowe
BY
Amster + Levy
Attorneys

Jan. 22, 1963 W. E. ROWE 3,074,145

SEMICONDUCTOR DEVICES AND METHOD OF MANUFACTURE

Filed Aug. 14, 1959 5 Sheets-Sheet 4

INVENTOR.
William E. Rowe
BY
Amster & Levy
Attorneys

INVENTOR.
William E. Rowe
BY Amster & Levy
Attorneys

United States Patent Office 3,074,145
Patented Jan. 22, 1963

3,074,145

SEMICONDUCTOR DEVICES AND METHOD OF MANUFACTURE

William E. Rowe, 53 Plummer Ave., Newburyport, Mass.

Filed Aug. 14, 1959, Ser. No. 833,750
16 Claims. (Cl. 29—25.3)

The present invention relates generally to semiconductor translating devices and the method of their manufacture, and in particular to an improved photographic process for the manufacture of semiconductor devices, including diodes and transistors, and to such semiconductor devices having improved physical and electrical properties. This is a continuation-in-part of my earlier filed application Serial No. 789,090, filed January 26, 1959, and entitled "Photographic Fabrication of Semiconductor Devices."

Recent developments in the semiconductor field have been directed toward the microminiaturization of translating devices with a view to attaining higher frequency response. With this tendency towards miniaturization, it has become exceptionally important to develop processes and constructions which make possible a high order of dimensional control, spacing and placement of the components of such semiconductor translating device. Closely allied to this problem is that of the facilities for mass production manufacture, with the capacity for a high order of reproducibility and reliability in such miniaturized translating devices.

Broadly it is an object of the present invention to provide improved semiconductor translating devices and methods for their manufacture capable of realizing one or more of the aforesaid objectives. Specifically, it is within the contemplation of the present invention to provide an improved method for manufacturing translating devices, including transistors and diodes, facilitating miniaturization, reproducibility and mass production manufacture at relatively low unit cost.

Of recent times there has been developed the mesa transistor which has a high frequency capability rendering such transistors particularly suitable for high frequency and high power applications. A typical mesa transistor includes a body of semiconductive material of one conductivity type having a diffused layer of the opposite conductivity type extending inwardly from one surface thereof. The one surface of the semiconductive body is formed with a mesa or active region to which there is bonded in the required critical spaced relation the emitter and base contacts of the transistor. Conveniently the emitter contact is prepared by evaporating and alloying aluminum to a prescribed region of the mesa, while the base contact is prepared by evaporating and alloying gold to the mesa, electrical connection being provided to the respective contacts or junctions by relatively fine connecting wires, such as a .4 mil gold wire. Essentially the transistor configuration is relatively rugged except for such connecting wires. It has been suggested that thermal compression bonds be provided for making the requisite electrical connections between the wires and the respective contacts. However practical experience indicates that such thermal compression bonding of the relatively fine wires to relatively small metallic contacts is a slow process involving a high order of skill, with a virtual need to process under optical magnification. Such bonding techniques, apart from being tedious and time consuming, still often result in poor bonds or crushing or otherwise altering the surfaces of the semiconductor body.

It is a further object of the present invention to provide an improved mesa transistor and method for its manufacture which obviates one or more of the aforesaid difficulties. Specifically, it is within the contemplation of the present invention to provide an improved process for making junction and lead connections to a semiconductor die or body, thereby facilitating the manufacture of miniaturized mesa transistors having improved mechanical and electrical properties and the requisite high frequency response.

I have found that a high order of control and reproducibility can be attained in the manufacture of semiconductor translating devices, particularly microminiaturized units, by the use of essentially photographic methods. By the techniques and constructions to be described, a high order of control may be established over the areal geometry of contacts, the spacing of contacts and the area of a mesa or other active region of a semiconductor body. Further, it is possible to create integral lead and contact assemblies to the semiconductor body or die in the fabrication of diodes and various types of transistors, thereby eliminating the need for making separate and individual electrical connections between the contacts and their respective leads, as by thermal compression bonding and other known methods. Advantageously, the provision of integral lead and contact assemblies minimizes the possibility of poor or improper electrical connections to the respective contacts and/or the possible alteration of the electrical properties of the device that may result from the crushing, destroying or contamination of the respective contacts and the adjacent regions of the semiconductor body incident to processing by known methods.

In accordance with article aspects of the present invention there is provided an improved semiconductor device which comprises a body of semiconductive material and an integral lead and contact assembly, with the contact of the assembly being bonded to the body and the lead projecting from the contact for making an electrical connection thereto. In a mesa transistor, first and second contact and lead assemblies are provided with the respective contacts being bonded to the mesa region of the transistor in spaced relation to each other, with the leads projecting from the respective contacts for the making of separate electrical connections thereto.

In accordance with method aspects of the present invention an integral metallic contact and lead assembly is provided by applying a coating of photosensitive resist material to a surface of a semiconductor body or die. An areal region of the coating corresponding to the contact and lead assembly is masked and the coating is exposed to light to harden the unmasked region thereof. The coating is removed in the areal region of the contact to expose the corresponding region of the surface of the semiconductor body. A metallic layer is applied to the areal region of the surface to form a contact and lead assembly bonded throughout to the surface of the semiconductor body. Thereupon the coating in the unmasked region is removed and provision is made for masking the portion of the metallic layer corresponding to the contact, leaving lead-underlying and lead-adjacent portions of the semiconductor body unprotected. The lead-underlying and lead-adjacent portions of the semiconductor body are exposed to an etchant which attacks the semiconductive material but does not affect the metal to thereby free the lead from the body. This completes a contact and lead assembly wherein the contact is bonded to the body of semiconductive material and the lead is integral with the contact and projects therefrom for the making of electrical connections to the contact.

The above brief description, as well as further objects, features and advantages of the present invention, will be more fully appreciated by reference to the following detailed description of a typical method of manufacture and of an improved semiconductor device attainable thereby, when taken in conjunction with the accompanying drawings, wherein:

FIGS. 1 to 17 inclusive are diagrammatic and perspective showings on a greatly enlarged scale showing successive steps in the processing of a typical transistor in accordance with the present invention in which:

Figures 14, 15:
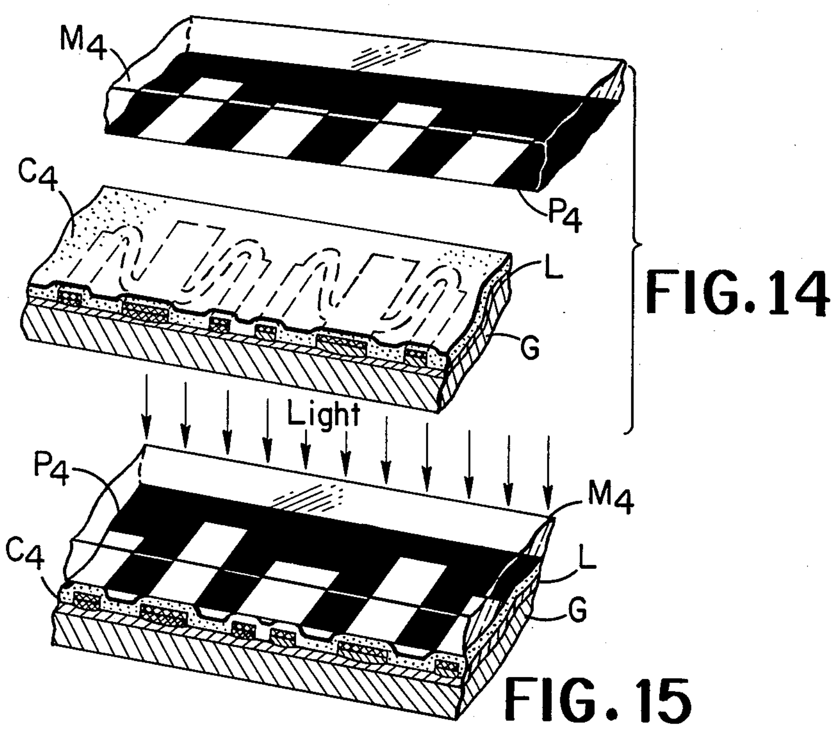
Figure 16:
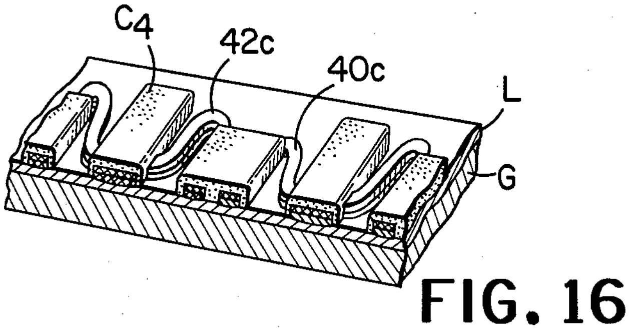
Figure 17:
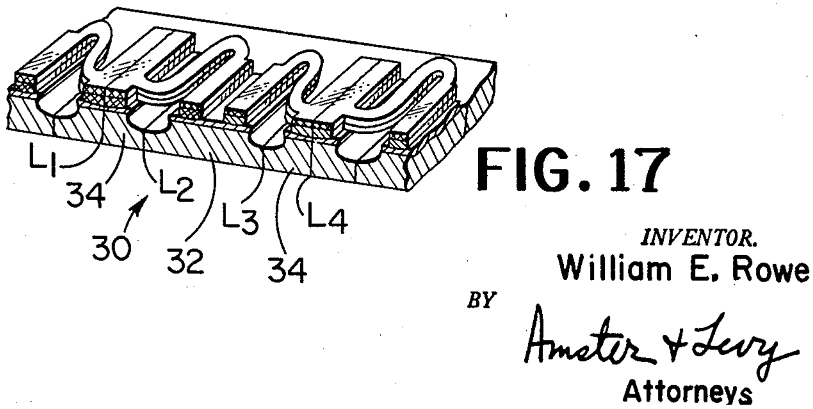
Figure 18:
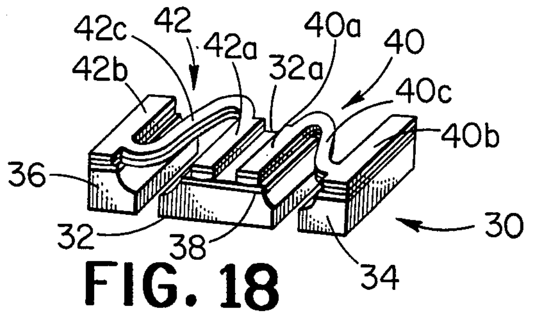
Figure 19:
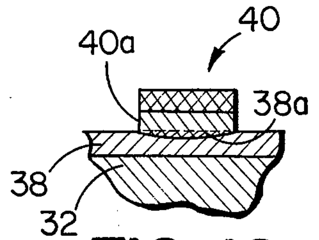
Figure 20:
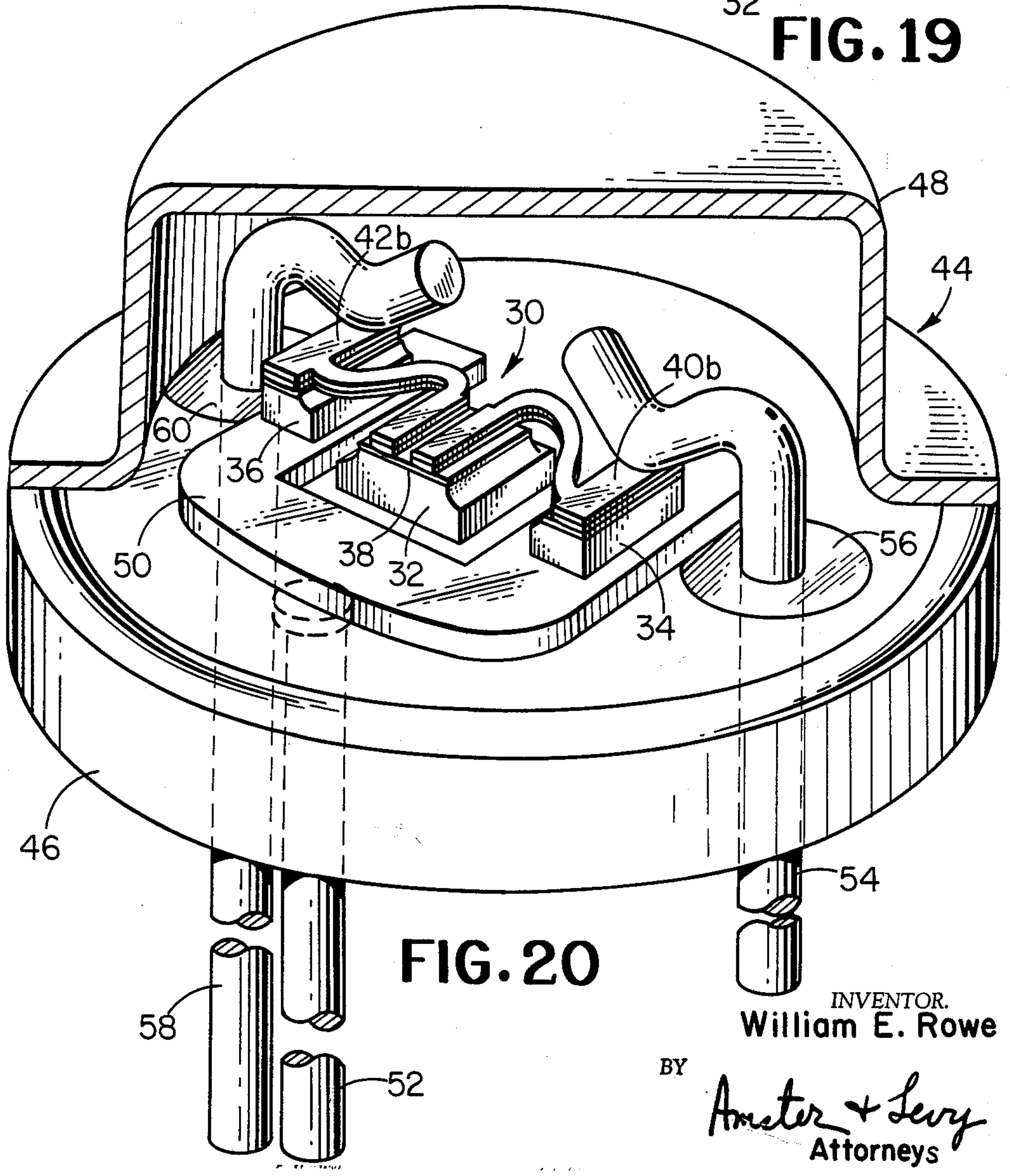

FIG. 14 is an exploded perspective view which shows the strip after plating the first and second lead and contact assemblies, with the strip being covered by a still further coating of photosensitive resist material and with a still further mask in position for assembly with the strip to create a still further photographic stencil for the selective etching of the lead adjacent and underlying regions of the semiconductor strip;

FIG. 15 shows the etching mask in position for exposure of the coating of photosensitive resist material to a light source;

FIG. 16 shows the strip after the exposure of the coating to light and the removal of the coating in the unhardened regions thereof, with the hardened coating providing an etching stencil protecting the respective contact regions of the semiconductor strip; and FIG. 17 is a perspective view of the semiconductor strip after etching thereof in the regions contiguous to and underlying the respective leads, with leads undercut and freed from the semiconductor body and with the etching creating alternating mesa regions and base strips, the semiconductor strip being shown as scored and broken along transverse medial lines of successive base strips to provide individual transistor dies each including a mesa region having space contacts bonded thereto and respective contacts joined by integral leads to base strips;

FIG. 18 is a perspective view of a single transistor die or configuration processed in accordance with the present invention preliminary to the mounting thereof;

FIG. 19 is an enlarged fragmentary elevational view showing the details of one of the contact or junction regions of the transistor; and FIG. 20 is a perspective view of the basic transistor die or configuration incorporated into a typical mount assembly.

Reference will now be made to FIGS. 1 to 20 of the drawings for a detailed description of a typical process in accordance with the present invention and an improved mesa transistor fabricated by such process. Although the invention is described in relation to the processing of a mesa transistor, it is to be expressly understood that the several aspects thereof find useful application in the fabrication of other types of semiconductor translating devices, including transistors and simple diodes. The drawings are on a greatly enlarged scale for the purpose of clarity in illustration, but it will be appreciated that the actual devices and components thereof are many times smaller.

In FIGS. 18 and 19 there is shown a basic transistor die, generally designated by the reference numeral 30, which is adapted to be incorporated in a complete transistor mount or package as shown in FIG. 20 by techniques which are generally understood. The transistor die or assembly 30 includes a semiconductor body 32 and spaced base parts likewise of semiconductive material at opposite sides thereof. The semiconductor body 32 and the base parts 34, 36 are fabricated as will be described hereinafter of a single strip of semiconductive material of one conductivity type, having a diffused layer 38 of the opposite conductivity type extending inwardly from one surface thereof. The semiconductive material is prepared by generally known techniques and may include a body of P type germanium having a diffused layer of N type germanium extending inwardly from the upper surface thereof to a prescribed depth in accordance with the desired electrical properties for such transistor. Bonded to the upper face of the semiconductor body 32 in the active or mesa region **32*a* thereof are spaced apart emitter and base contacts or junctions of respective first and second integral contact and lead assemblies, generally designated by the reference numerals 40, 42. The emitter lead and contact assembly 40, which may include an underlayer of evaporated aluminum built up to a prescribed thickness by gold plating, includes an emitter contact 40*a* bonded to the mesa or active region 32*a* of the semiconductor body 32, a base strip 40*b* bonded to the base part 34, and an integral lead 40*c* illustrated herein as extending from one end of the emitter contact 40*a* towards the opposite end of the base strip 40*b*. The base contact and lead assembly 42, which may be fabricated of an evaporated gold layer built up to thickness by gold plating, includes a base contact 42*a* bonded to the mesa or active region 32*a* of the semiconductor body 32, a base strip 42*b* bonded to the base part 36 and a lead 42*c* joining one end of the base contact 42*a* to the opposite end of the base strip 42*b*. As is generally understood and seen in FIG. 19, the metallic emitter contact 40*a* is alloyed to the N type diffused layer 38 of the semiconductor body 32 to form a diffused alloyed junction including P type germanium 38*a*** in the region of diffusion. Similarly the metallic base contact is alloyed to the semiconductor body 32. Although the emitter contact is described as being fabricated by evaporating aluminum onto the upper face of the layer 38 of the semiconductor body 32, it will be appreciated that any combinations of the group II metals of aluminum, gallium or indium may be used in accordance with the techniques generally known for the processing and fabrication of such area junctions or contacts.

Referring now to FIG. 20, there is shown the transistor die or assembly 30 in a typical commercial package 44 including a header 46 and an envelope or can 48 marginally secured, as by welding, to the header to provide a substantially airtight enclosure about the assembly 30. The semiconductor body 32 is bonded to the header 46, as by the provision of a gold-germanium alloyed contact. In a typical assembly process, the region of the header 46 substantially coextensive with the undersurface of the semiconductor body 32 is gold plated or in the alternative covered with a gold foil of a thickness of the order of .001 of an inch. Upon heating at a temperature of the order of 350° C. to 375° C., the gold-germanium alloyed contact is completed to bond the semiconductor body 32 to the header 46. Resting on the header 46 is an insulating member 50 of horseshoe configuration which may be of mica and arranged to provide respective supports for the base parts 34, 36 and their bonded base strips 40*b*, 42*b*. The requisite electrical connections are made to the transistor assembly 30 by the provision of a collector lead 52 which depends from the header 46 and is electrically connected thereto and to the semiconductor body 32, an emitter lead 54 which extends through an insulator 56 and is bonded to the base strip 40*b* of the integral emitter contact and lead assembly 40, and a base lead 58 which extends through an insulator 60 and is bonded to the base strip 42*b* of the base contact and lead assembly 42. The leads 54, 58 are connected in a manner to hold the base strips 40*b*, 42*b* and the underlying mica insulating member 50 in frictional contact with header 46. A latitude of modification, substitution and changes attended the foregoing description of an illustrative transistor unit.

Reference will now be made to FIGS. 1 to 17 inclusive for description of a typical process for the manufacture of integral contact and lead assemblies and semiconductor translating devices in accordance with the present invention, the illustrative process dealing specifically with the manufacture of a mesa transistor of the type shown in FIGS. 18 to 20 inclusive.

Figure 1:
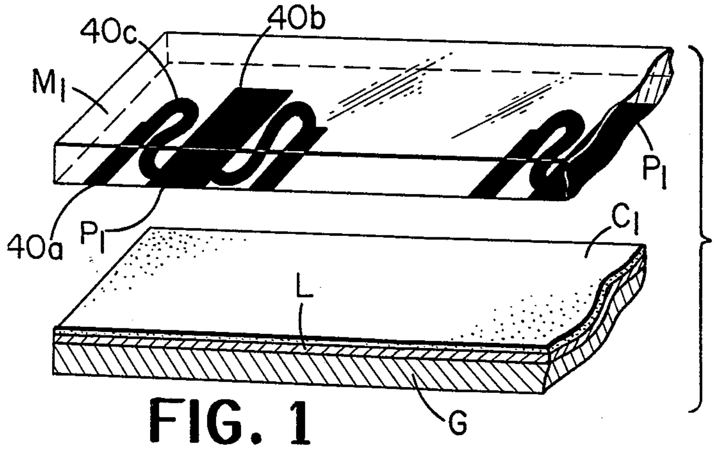
FIG. 1 is an exploded view which shows a semiconductor strip having a coating of photosensitive resist material adhered to one surface thereof, with a mask in position for assembly therewith.

In FIG. 1, there is shown a strip or wafer of semiconductive material, generally designated by the letter G, from which successive semiconductor assemblies 30 are formed each including the semiconductor body 32 with the semiconductor base parts 34, 36 on opposite sides thereof and broken away therefrom. The method to be described is particularly suitable for the multiple processing of transistor dies of the type shown in FIGS. 18 and 19 which are prepared as one unit and broken away from each other by scoring along prescribed parting or break lines, as will be subsequently described. The germanium wafer or strip G may be of P type germanium of a prescribed resistivity which is prepared, lapped, polished, etched and washed in accordance with generally known techniques and provided with a diffused layer L extending inwardly from the upper face or surface thereof.

A coating or layer $C_1$ of a photosensitive resist material is applied to the upper surface of the semiconductor strip G. The photosensitive resist material may be any one of a number of commercially available resist materials which are soluble in a prescribed solvent, including without limitation, Eastman Kodak type KPR solution which is soluble in xylol and is manufactured by the Eastman Kodak Company, Clerkin type CFC solution which is water soluble and is manufactured by Clerkin Company, or Pitman Hot Top which is made by the Pitman Company, or other comparable photosensitive resist material which exhibit the properties of hardening upon exposure to light, with the unhardened or unexposed portions thereof being removable by washing. The coating $C_1$ of the photosensitive resist material may be applied by dipping, spraying or roll coating, care being taken to prevent excessive light from striking the photosensitive resist to avoid premature hardening or fixing thereof. In the application of the coating, the photosensitive resist material may be maintained at room temperature with the applied layer being made as thin as possible, something less than two thousandth of an inch thick. This avoids prolongation of subsequent processing steps and promotes precision in the ultimate patterns formed in accordance with the present process.

Figure 2:
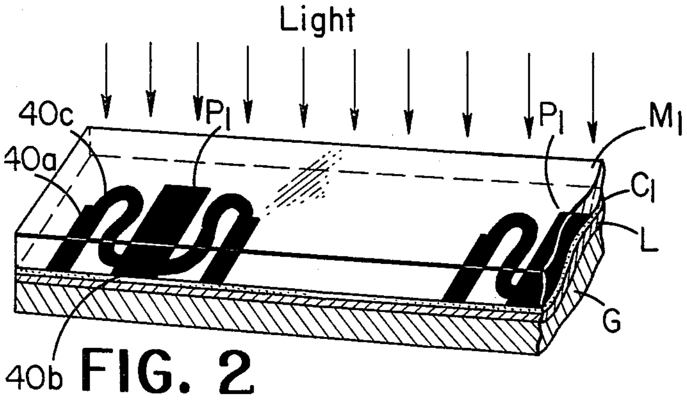
FIG. 2 shows the mask in position against the coating of photosensitive resist material for exposure of the unmasked regions of the coating to a light source to create a first photographic stencil.

A mask $M_1$ is provided which is adapted to be superimposed upon the coating of photosensitive resist material $C_1$, as shown in FIG. 2, with the mask $M_1$ being formed of a transparent material such as glass and having thereon a series of spaced apart identical opaque patterns $P_1$. Each of the patterns $P_1$ is symmetrical about a longitudinal center line extending transversely of the mask $M_1$ with each longitudinal half-section providing respectively a contact (e.g. contacts 40*a*, 42*a*), a base strip (e.g. 40*b*, 42*b*) and an integral connecting lead (e.g. 40*c*, 42*c*). The right half-section of the full pattern shown on the mask $M_1$ in FIGS. 1 and 2 will ultimately provide the emitter contact and lead assembly 40 shown in FIG. 18 and accordingly is correspondingly numbered in the diagrammatic showing of FIGS. 1 and 2.

The mask $M_1$ superimposed upon the coated strip of germanium G and the coating $C_1$ is exposed to a strong point source of light such that the unmasked regions of the coating $C_1$ becomes light hardened or fixed, with the masked regions corresponding to the opaque patterns $P_1$ being unhardened and removable by developing or washing with an appropriate bath, such as warm water. Using Eastman Kodak KPR as the photosensitive resist material, the light source may be a General Electric photomicrographic lamp having a rating of 30 amperes at 11 volts, with the point source being arranged at approximately twelve inches from the masked strip of germanium and with an exposure time of the order of four minutes. Alternatively, light from a 35 ampere open arc lamp may be used as the point of source at a distance of approximately four feet and with an exposure time of approximately ¾ of a minute.

Figures 3, 4:
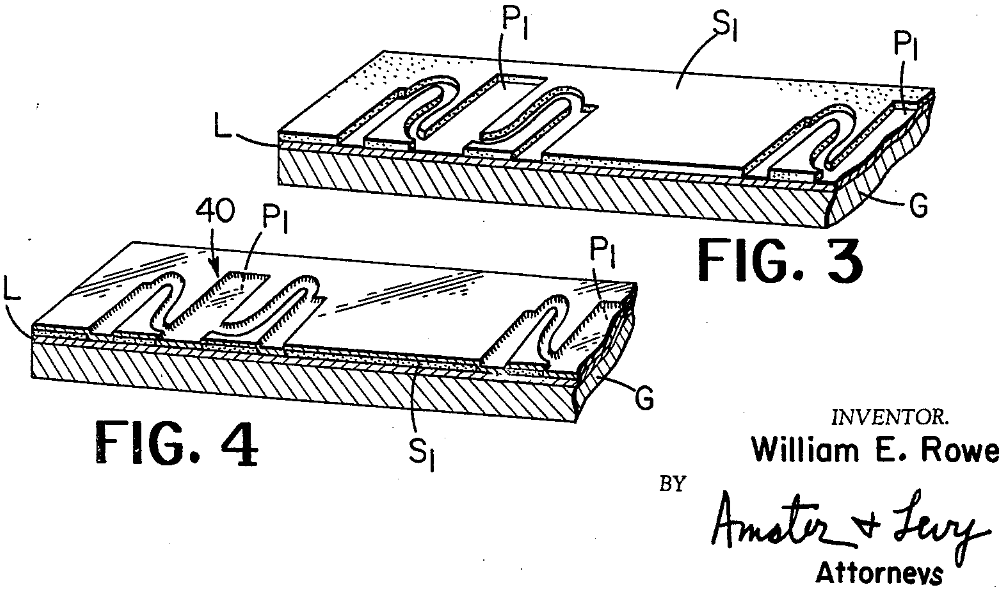
FIG. 3 shows the mask removed and the photosensitive resist material washed away in the unexposed region to provide the photographic stencil having a pattern in the coating and on the surface of the semiconductor strip corresponding to a desired contact and lead assembly.
FIG. 4 shows the strip after the evaporation of a metallic coating onto the stencil-protected surface of the strip.

After the prescribed exposure interval in accordance with the type of photosensitive resist material, the strip with the exposed coating is washed to remove the photosensitive resist material in the unexposed areas thereby providing a photographic stencil $S_1$ as shown in FIG. 3 intimately bonded to the upper surface of the germanium strip G having formed therein at spaced points along its length patterns $P_1$ through which the adjacent surfaces of the semiconductor strips are exposed for processing.

Thereupon the required metallic material for the integral contact and lead assemblies is applied to the exposed regions of the semiconductor strip G such that the metallic material is intimately bonded to the exposed surface of such strip. In this illustrative embodiment wherein the layer L contiguous to the exposed surface is of N type germanium, a group III metal appropriate to provide a metallic emitter contact is deposited through the stencil $S_1$ to provide successive metal patterns $P_1$ on the semiconductor strip G. Specifically, aluminum is evaporated onto the stencil $S_1$ to provide spaced emitter contact and lead assemblies 40 in the regions corresponding to the patterns $P_1$. During such vapor deposition of the aluminum, it will be appreciated that the stencil $S_1$ protects the surface being processed against the deposition thereon of the metallic material for the emitter contact.

Figure 5:
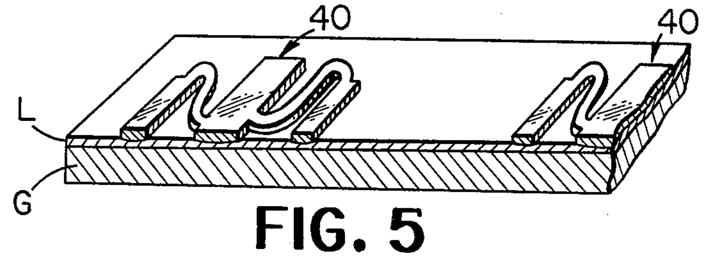
FIG. 5 shows the strip with the stencil or coating of the photosensitive resist removed and having successive first metallic lead and contact assemblies bonded thereto at spaced locations along the length thereof.

After the vapor deposition of the metallic material for the assembly 40 is completed, the strip G is exposed to the appropriate solvent for the photosensitive resist material (e.g. xylol for Eastman Kodak KPR), with the hardened resist being dissolved and carrying away the unwanted aluminum. Successive contact and lead assemblies 40 are provided as shown in FIG. 5, with a substantially clean and uncontaminated semiconductor surface separating successive assemblies.

The emitter contact is then completed by alloying the aluminum to the germanium by heating to a temperature in the range of 423° C. to 600° C. and maintaining said elevated temperature for a period of approximately 20 minutes which converts the region immediately beneath the evaporated aluminum to germanium of P conductivity type (see FIG. 19).

Figure 6:
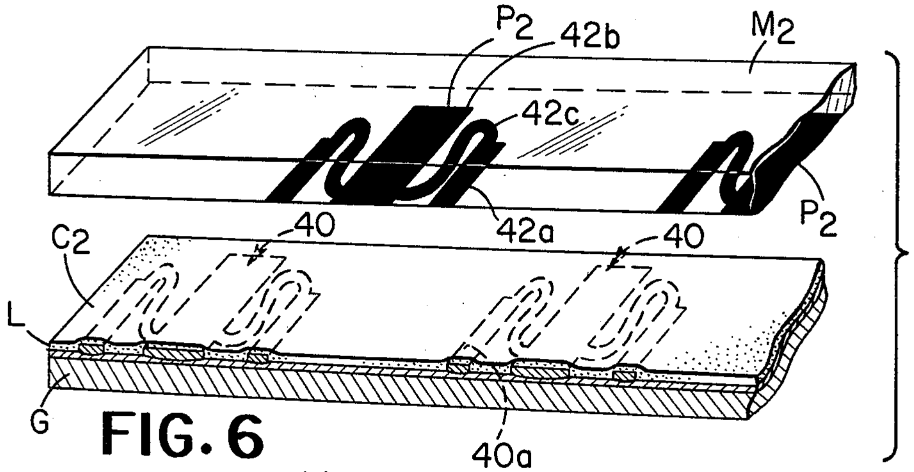
FIG. 6 is an exploded perspective view which shows the semiconductor strip having the successive spaced first contact and lead assemblies bonded thereto and covered by a further coating of photosensitive resist material, with a further mask in position for assembly therewith.
Figure 7:
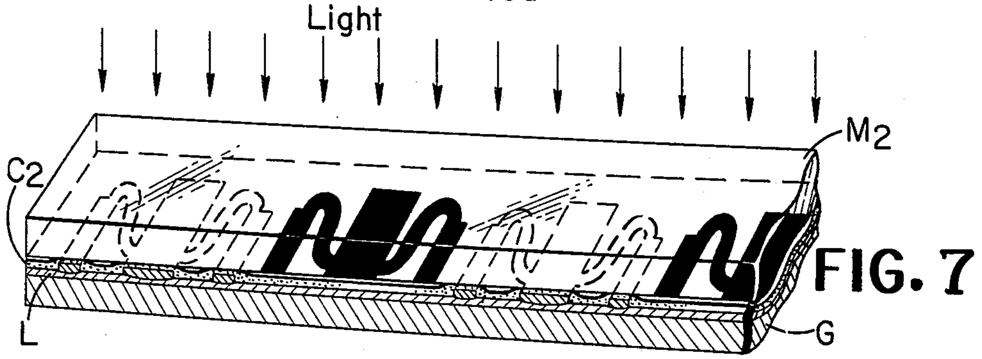
FIG. 7 shows the second mask assembled with the semiconductor strip for exposure to a light source to create a further photographic stencil for bonding further metallic contact and lead assemblies to the strip in alternation with the first formed contact and lead assemblies.
Figure 8:
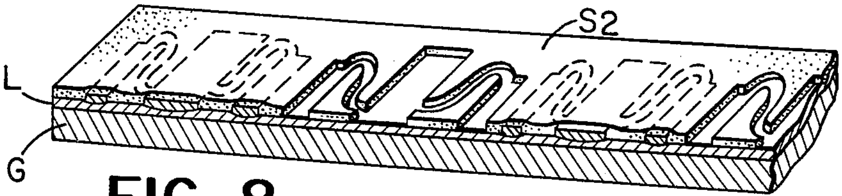
FIG. 8 shows the further photographic stencil formed after exposure to light and removal of the unexposed regions of the coating of photosensitive resist material.
Figures 9, 10, 11:
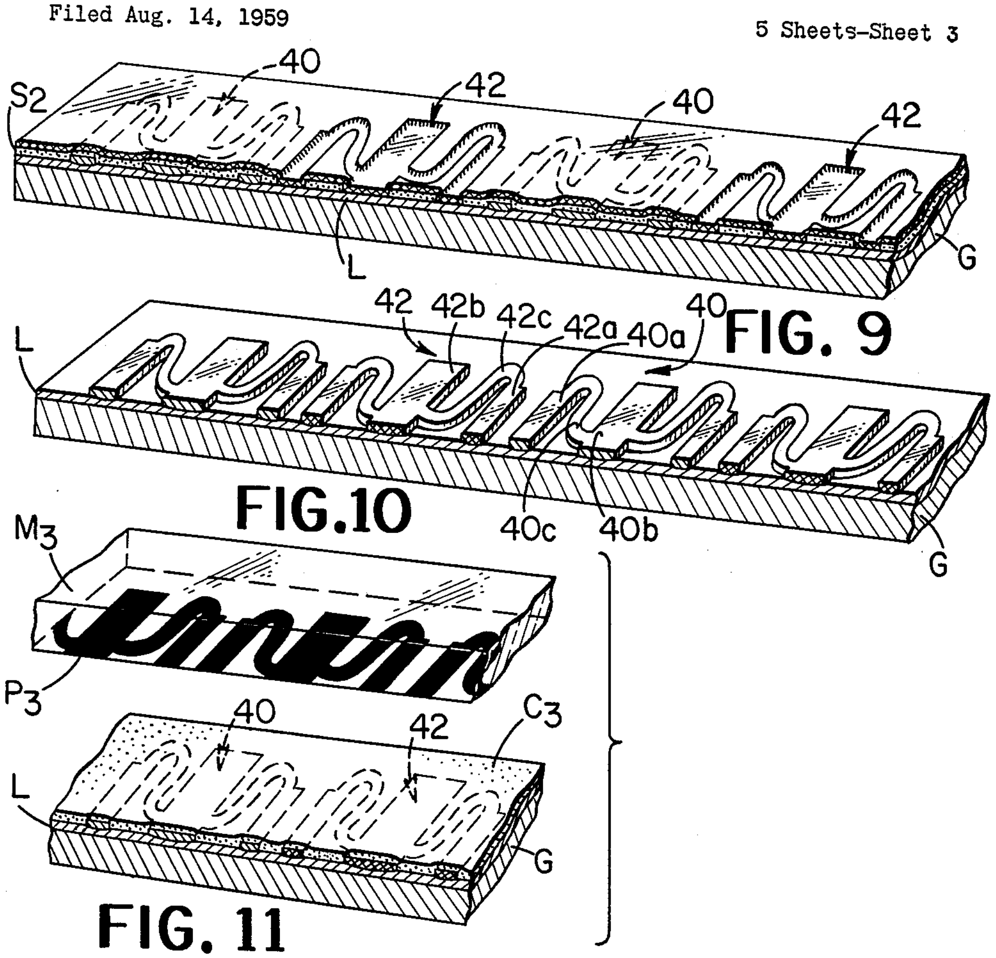
FIG. 9 shows the strip after evaporation of a further metallic coating over the further photographic stencil to create the further lead and contact assemblies in alternation with the first formed lead and contact assemblies.
FIG. 10 shows the strip with the completed alternating first and second lead and contact assemblies, with the further photographic stencil removed.
FIG. 11 is an exploded perspective view which shows a still further mask in position for assembly with the semiconductor strip having the alternating first and second lead and contact assemblies bonded thereto and coated by a still further coating of photosensitive resist material preliminary to the build-up by plating of the thickness of the respective contact assemblies.

Upon completion of the first or emitter contact and lead assemblies 40 to the semiconductor strip, the described masking, exposing, washing and vapor deposition steps are repeated in the regions intermediate successive emitter assemblies 40 to provide the required base contact and lead assemblies 42. Referring specifically to FIGS. 6 to 10 inclusive, it is seen that the identical steps are repeated with the orientation of the mask $M_2$ in relation to the germanium strip G being such as to establish the required separation between the emitter and base contacts *40a*, *42a* respectively of the final transistor unit 30. Specifically and as seen in FIG. 6, the germanium strip G has applied over the surface being processed a further or second coating $C_2$ of the photographic resist material, with the coating $C_2$ covering the respective assemblies 40 bonded to the strip G. The mask $M_2$ is prepared with successive opaque patterns $P_2$ at the requisite spacing to provide the base contact and lead assemblies 42. The pattern $P_2$ are symmetrical about a longitudinal center line extending transversely of the germanium strip, with the right half-section of the pattern $P_2$ providing respectively the contact *42a*, the base strip *42b* and the integral lead *42c* for the base contact and lead assembly 42. The mask $M_2$ is transposed longitudinally of the strip to provide the requisite interspace between the emitter contact *40a* and the base contact *42a*, which interspace may be of the order of .0005 of an inch, the showing of the drawings being greatly exaggerated in the interest of clarity. With the mask $M_2$ assembled over the strip G as shown in FIG. 7 the exposure to light takes place to harden or fix the coating $C_2$. This provides the stencil $S_2$ shown in FIG. 8 after the unexposed regions of the coating $C_2$ corresponding to the patterns $P_2$ are washed away. Thereupon, and as shown in FIG. 9, a material appropriate for the base contact, such as gold containing approximately 1 percent antimony is evaporated over the stencil $S_2$ to provide successive spaced base lead and contact assemblies 42 in alternation with the emitter lead and contact assemblies 40. The germanium strip G with the vapor deposited gold coextensive with the stencil $S_2$ is then subjected to the required solvent for the photosensitive resist material (e.g. xylol for Eastman Kodak KPR) to dissolve the stencil $S_2$ and carry away the excess gold, leaving behind the base contact and lead assemblies intermediate the emitter contact lead assemblies.

Figure 12:
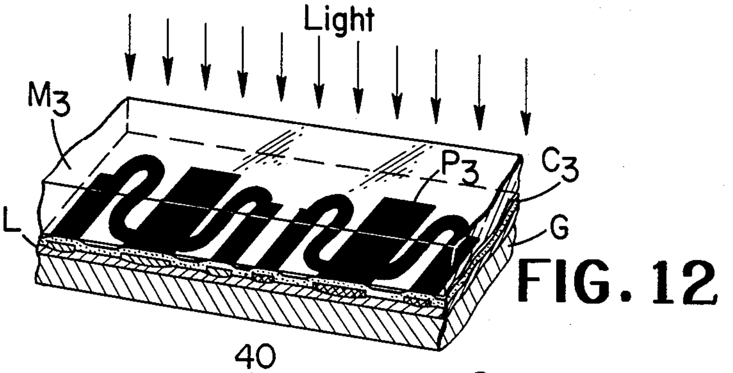
FIG. 12 shows the still further mask in position for exposure to light source.
Figure 13:
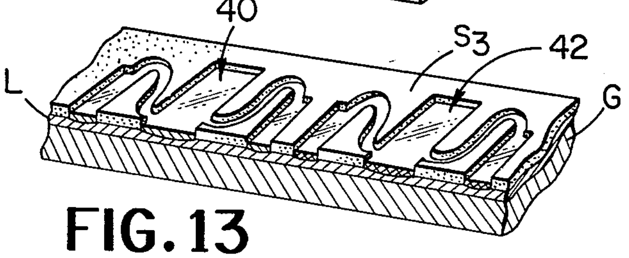
FIG. 13 shows the still further photographic stencil, with the regions corresponding to the first and second contacts which were not hardened incident to the exposure to the light source removed to provide a photographic stencil for plating of the first and second lead and contact assemblies.

The base contact is then completed by alloying the gold to the germanium by heating to a temperature in the range of 350° C.–420° C. and maintaining such elevated temperature for a period of approximately twenty minutes. The highest temperature used for gold alloying to complete the base contact is lower than the lowest temperature for aluminum alloying, such that the second and separate alloying step does not affect the previously alloyed emitter contacts. The resultant contact and lead assemblies bonded to the strip shown in FIG. 10 are plated to build up the thickness of the respective contact and lead assemblies, as by gold plating as shown in FIGS. 11–13 inclusive. Specifically, a coating $C_3$ of photosensitive resist material is applied to the germanium strip G, with the successive alternating contact and lead assemblies 40, 42, being covered by such coating. A mask $M_3$ is provided which is formed with opaque patterns $P_3$ of the configuration of the respective assemblies 40, 42 and with the same spacing interval. The mask $M_3$ is assembled over the coating $C_3$ in the required registry, and upon exposure to a light source, the coating $C_3$ is light hardened or fixed in the clear regions of the mask $M_3$, with the coating remaining unhardened in the regions corresponding to the patterns $P_3$ which overlie and register with the respective alternating assemblies 40, 42. With the mask $M_3$ removed, the unfixed regions of the coating are washed away to complete the stencil $S_3$ having successive patterns formed therein through which the alternating assemblies 40, 42 are exposed, as shown in FIG. 13. Thereupon the stencil-protected germanium strip G is subjected to plating to build up the thickness of the assemblies 40, 42 to the extent required. The plating procedure is conventional and accordingly is not described in detail in the interest of brevity. After the plating is completed, the stencil $S_3$ is removed from the strip G by being subjected to the appropriate solvent for the photosensitive resist material, leaving behind a strip substantially in the form shown in FIG. 10 but with the successive aluminum and gold assemblies having plated thereon a layer of gold.

The final step of the processing involves the freeing of the leads of the assemblies 40, 42 from the semiconductor strip G and the creation of successive raised areas corresponding to the mesa or active regions 38 of the transistor unit 30. Specifically, and as seen in FIG. 14, the germanium strip G has applied over the successive built-up contact and lead assemblies 40, 42 a still further coating $C_4$ of photosensitive resist material. The coating $C_4$ is of substantial thickness and is of a resist selected to be impervious to attack by etchants which are capable of selectively attacking the semiconductor material. Eastman Kodak KPR, which is soluble in xylol, is suitable as a protective means during the etching step. A mask $M_4$ is prepared with an opaque pattern $P_4$ corresponding to all regions of the surface of the strip G being processed wherein the etching or undercutting is to occur. Stated somewhat differently, the opaque pattern $P_4$ in the mask $M_4$ frames successive base strip and mesa regions of the final transistor unit 30 shown in FIG. 18. With the mask $M_4$ in position as shown in FIG. 15, the exposure to light takes place to harden or fix the coating $C_4$ in the regions corresponding to successive base strips and mesas. This provides respective hardened protective coatings over the base strips and mesas; and upon removal of the coating $C_4$ in the unexposed regions, the leads *40c*, *42c* and the regions adjacent thereto and surrounding the mesa and base strips are freed for the exposure to the etchant for the semiconductor. The etching may be with hydrofluoric acid, which does not attack the leads, but which vigorously attacks the exposed portions of the semiconductor strip including regions underlying the leads. Various hydrofluoric acid solutions may be used for this selective etching step. By way of example, depending upon the desired surface properties and other parameters, any one of the following solutions may be utilized:

I 250 cc. conc. $HNO_3$
150 cc. conc. HF
150 cc. glacial-acetic acid
3 cc. bromide

II 1 volume 3% $H_2O_2$
1 volume conc. HF
4 volume $H_2O$

III 20 cc. conc. $HNO_3$
40 cc. conc. HF
40 cc. $H_2O$ containing 2 g. $AgNO_3$

This selective etching step achieves the relatively rapid dissolution of the semiconductor material and forms the mesa or active regions 38 and brings about the removal of the semiconductor material beneath the metallic leads or extensions *40c*, *42c*. The etching process is continued for a period sufficient to free the leads from the semiconductor strip, but such freed leads are still integral with the associated contact and base parts of the respective assemblies to provide the requisite electrical connections therebetween. If the gold plating is sufficiently heavy, it may be possible to etch the semiconductor material directly without the necessity of creating a resist mask, as shown in FIGS. 14 and 15. Further, in some instances it may be desirable to mask the leads of the successive contact and lead assemblies such that the metal thereof is protected against the effects of the semiconductor etchant, the masking being such as to enable the leads to still be effectively undercut and freed from the semiconductor strip. In the illustrative process wherein the base strips and mesa regions are masked, after the semiconductor etching step is completed, the hardened resist is removed by exposure to the required solvent for the selected photosensitive resist material.

As seen in FIG. 17, the strip is now formed into a series of elemental transistor units 30 which are separated or parted one from another by dicing with a diamond saw or by chemical separation, care being taken to avoid damage to the integral leads during such separation. Specifically, and as seen best in FIG. 17, the parting or scoring takes place along transverse parting lines $L_1$, $L_2$, $L_3$ and $L_4$. The parting lines $L_1$, $L_4$ are arranged longitudinally of and medially of the base strips and extend entirely through the semiconductor strip and the bonded metallic layers, while the parting lines $L_2$, $L_3$ are spaced in relation to each other to establish the required length for the semiconductor body 32, with the portion of the semiconductor strip intermediate the parting lines $L_1$, $L_2$ providing the base part 34 and the portion of the semiconductor strip between the parting lines $L_3$, $L_4$ creating the base part 36. When thus separated, the transistor configuration 30 shown in FIGS. 18 and 19 is completed and may be mounted as shown in FIG. 20.

From the foregoing it will be appreciated that the invention finds useful application in the manufacture of other types of transistors, as well as in the fabrication of diodes. The improved lead and contact assemblies eliminate the need of separate wire connections to the rectifier contacts or junction of the semiconductor translating devices which has been found to be a limiting factor in the ruggedization of such devices. The provision of such integral lead and contact assemblies eliminates the necessity of separate operational steps for making electrical connection between contacts and wires, as by thermal compression bonding, with the attendant disadvantages, expense, and possible source of shrinkage. The method described promotes a high order of reproducibility and enables, by the precise controls over the successive processing steps, extremely accurate control over the areal extent, spacing and location of the critical components of semiconductor translating devices. Many and varied configurations for the lead and contact assemblies may be attained by altering the patterns of the respective masks or stencils, thus making the process useful in the manufacture of many different types of units.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. In the manufacture of a semiconductor device having a body of semiconductive material, the method of forming an integral metallic contact and lead assembly having a contact bonded to said body and a lead projecting therefrom comprising the steps of applying a coating of photosensitive resist material to a surface of said body, masking an areal region of said coating corresponding to said contact and lead assembly, exposing said coating to light to harden the unmasked regions thereof, removing said coating in said areal region to expose the corresponding areal region of said surface, applying a metallic layer to said areal region of said surface to form said contact and lead assembly bonded throughout to said body, removing said coating in the unmasked regions thereof, applying a protective coating to the portion of said metallic layer corresponding to said contact leaving the lead-underlying and lead-adjacent portions of said body unprotected, and etching said lead-underlying and lead-adjacent portions of said body to free said lead from said body.

2. In the manufacture of a semiconductor device having a body of semiconductive material, the method of forming an integral metallic contact and lead assembly having a contact bonded to said body and a lead projecting therefrom including the steps of applying a coating of photosensitive resist material to a surface of said body, masking an areal region of said coating corresponding to said assembly, exposing said coating to light to harden the unmasked regions thereof, removing said coating in said areal region to expose the corresponding areal region of said surface evaporating and alloying a metallic layer to said areal region of said surface to form said contact and lead assembly bonded throughout to said body, removing said coating in the masked regions thereof, and etching away lead-underlying and adjacent portions of said body to free said lead from said body.

3. In the manufacture of a semiconductor device according to claim 2, the further steps of building up the thickness of said metallic layer by electroplating further metallic material thereto.

4. In the manufactuer of a semiconductor device having a body of semiconductive material, the method of forming an integral metallic contact and lead assembly having a contact bonded to said body and a lead projecting therefrom comprising the steps of applying a coating of photosensitive resist material to a surface of said body, masking an area region of said coating corresponding to said contact and lead assembly, exposing said coating to light to harden the unmasked regions thereof, removing said coating in said areal region to expose the corresponding areal region of said surface to form said contact and lead assembly bonded throughout to said body, removing said coating in the unmasked regions thereof, applying a coating of photosensitive resist material to said surface of said body and said assembly bonded thereto, masking a further areal region of said coating corresponding to said lead and the adjacent portions of said body, exposing said coating to light to harden the unmasked regions thereof, removing said coating from said further areal region of said coating to expose said lead and the adjacent portions of said body, etching the lead-underlying and adjacent portions of said body to free said lead from said body, and removing said coating in the unmasked regions thereof.

5. In the manufacture of a semiconductor device having a body of semiconductive material, the method of forming an integral metallic junction and lead assembly having an area junction bonded to said body and a lead projecting therefrom comprising the steps of applying a coating of photosensitive resist material to a surface of said body, masking an areal region of said coating corresponding to said junction and lead assembly, exposing said coating to light to harden the unmasked regions thereof, removing said coating in said areal region to expose the corresponding areal region of said surface, applying a metallic layer to said areal region of said surface to form said junction and lead assembly bonded throughout its extent to said body, removing said coating in the masked regions thereof, heat treating said assembly to alloy said junction to said body applying a coating of photosensitive resist material to said surface of said body and said assembly bonded thereto, masking a further areal region of said coating corresponding to said lead and the adjacent portions of said body, exposing said coating to light to harden the unmasked regions thereof, removing said coating from said further areal region of said coating to expose said lead and the adjacent portions of said body to free said lead from said body, and removing said coating in the unmasked regions thereof.

6. In the manufacture of a semiconductor device, the steps including forming a semiconductor body of one conductivity type with a diffused layer of the opposite conductivity type extending inwardly from one surface thereof, applying a coating of photosensitive resist material to said one surface, masking a prescribed region of said coating corresponding to a lead and contact assembly and exposing said coating to a light source to harden the unmasked regions of said coating, removing said coating in said prescribed region to expose the corresponding region of said one surface, applying a metallic layer to said corresponding region, removing said coating from said unmasked regions, and alloying said metallic layer to said body.

7. A method of manufacturing a semiconductor device comprising the steps of forming a semiconductor body of one conductivity type with a diffused layer of the opposite conductivity type extending inwardly from one surface thereof, applying a coating of photosensitive resist material to said one surface, masking a prescribed region of said coating corresponding to a lead and contact assembly, exposing said coating to a light source to harden the unmasked regions of said coating, removing said coating in said prescribed region to expose the corresponding region of said one surface, applying a metallic layer to said corresponding region, removing said coating from said unmasked regions, applying a further coating of photosensitive resist material to said one surface, masking a further prescribed region of said further coating corresponding to a further lead and contact assembly, exposing said further coating to a light source to harden the unmasked regions of said further coating, removing said further coating in said further prescribed region to expose a further corresponding region of said one surface, applying a metallic layer to said further corresponding region, removing said coating from said unmasked regions, masking the contacts, of said first and second assemblies, and etching away said semiconductor body beneath and about the leads of said first and second assemblies to free the leads of the respective metallic layers from said semiconductor body.

8. A method of manufacturing a mesa transistor die comprising the steps of forming a semiconductor strip of one conductivity type with a diffuse layer of the opposite conductivity type extending inwardly from one surface thereof, applying a first coating of photosensitive resist material to said one surface, masking a first prescribed region of said first coating corresponding to a first lead and contact assembly including a base strip, junctions at opposite sides of and spaced from said base strip and respective leads joining said base strip to said junctions, exposing said first coating to a light source to harden the unmasked regions of said first coating, removing said first coating in said first prescribed region to expose the corresponding region of said one surface, applying a first metallic layer to said corresponding region, removing said coating from said unmasked regions, alloying said first metallic layer to said one surface to complete said junctions, applying a second coating of photosensitive resist material to said one surface, masking a second prescribed region of said second coating corresponding to a second lead and contact assembly including a base strip, junctions at opposite sides of and spaced from said base strip and respective leads joining said base strip to said junctions, exposing said second coating to a light source to harden the unmasked regions of said second coating, removing said second coating in said second prescribed region to expose a second corresponding region of said one surface, applying a second metallic layer to said second corresponding region, removing said second coating from said unmasked regions, alloying said second metallic layer to said one surface to complete said junctions, the portion of said strip including a longitudinal half section of the base strip of said first assembly and the lead and junctions thereof with the adjacent spaced junction and lead and longitudinal half section of the base strip of said second assembly comprising a mesa transistor die with said spaced junctions substantially defining the mesa region thereof, selectively etching away said strip about said mesa region thereof and contiguous to and underlying said leads to free said leads from said strip, and parting said portion of said strip to provide a mesa transistor die.

9. In the manufacture of a mesa transistor die, the steps of forming a semiconductor strip of one conductivity type with a diffused layer of the opposite conductivity type extending inwardly from one surface thereof, applying a first coating of photosensitive resist material to said one surface, masking a first prescribed region of said first coating corresponding to a first lead and contact assembly including a base strip, junctions at opposite sides of and spaced from said base strip and respective leads joining said base strip to said junctions, exposing said first coating to a light source to harden the unmasked regions of said first coating, removing said first coating in said first prescribed region to expose the corresponding region of said one surface, applying a first metallic layer to said corresponding region, removing said coating from said unmasked regions, alloying said first metallic layer to said one surface to complete said junctions, applying a second coating of photosensitive resist material to said one surface, masking a second prescribed region of said second coating corresponding to a second lead and contact assembly including a base strip, junctions at opposite sides of and spaced from said base strip and respective leads joining said base strip to said junctions, exposing said second coating to a light source to harden the unmasked regions of said second coating, removing said second coating in said second prescribed region to expose a second corresponding region of said one surface, applying a second metallic layer to said second corresponding region, removing said second coating from said unmasked regions, and alloying said second metallic layer to said one surface to complete said junctions, the portion of said strip including a longitudinal half section of the base strip of said first assembly and the lead and junctions thereof with the adjacent spaced junction and lead and longitudinal half section of the base strip of said second assembly comprising a mesa transistor die with said spaced junctions substantially defining the mesa region thereof.

10. In the manufacture of a mesa transistor die according to claim 9, the further step of plating additional metallic material into said first and second metallic layers to build up the thickness thereof.

11. A method of manufacturing mesa transistor dies comprising the steps of forming a semiconductor strip of one conductivity type with a diffused layer of the opposite conductivity type extending inwardly from one surface thereof, applying a first coating of photosensitive resist material to said one surface, masking first spaced-apart prescribed regions of said first coating each corresponding to a first lead and contact assembly with each including a base strip, junctions at opposite sides of and spaced from said base strip and respective leads joining said base strip to said junctions, exposing said first coating to a light source to harden the unmasked regions of said first coating, removing said first coating in said first regions to expose the corresponding regions of said one surface, applying a first metallic layer to said corresponding regions, removing said coating from said unmasked regions, alloying said first metallic layers to said one surface, applying a second coating of photosensitive resist material to said one surface, masking a second spaced-apart prescribed regions of said second coating alternating with said first regions, said second regions each corresponding to a second lead and contact assembly with each including a base strip, junctions at opposite sides of and spaced from said base strip and respective leads joining said base strip to said junctions, exposing said second coating to a light source to harden the unmasked regions of said second coating, removing said second coating in said second regions to expose the corresponding regions of said one surface, applying a second metallic layer to said second corresponding regions, removing said second coating from said unmasked regions, alloying said second metallic layer to said one surface, the portion of said strip including a longitudinal half section of the base strip of said first assembly and the lead and junctions thereof with the adjacent spaced junction and lead and longitudinal half section of the base strip of said second assembly comprising a mesa transistor die with said spaced junctions substantially defining the mesa region thereof, selectively etching away said strip about said mesa region thereof and contiguous to and underlying said leads to free said leads from said strip, and parting successive portions of said strip to provide separate mesa transistor dies.

12. In the manufacture of a mesa transistor die from a semiconductor strip of one conductivity type with a diffused layer of the opposite conductivity type extending inwardly from one surface thereof, the steps of applying a first coating of photosensitive resist material to said one surface, masking a prescribed region of said first coating corresponding to a lead and contact assembly including a base strip, junctions at opposite sides of and spaced from said base strip and respective leads joining said base strip to said junctions, exposing said coating to a light source to harden the unmasked regions of said first coating, removing said coating in said prescribed region to expose the corresponding region of said one surface, applying a metallic layer to said corresponding region, removing said coating from said unmasked regions, and alloying said metallic layer to said one surface.

13. In the manufacture of a semiconductor device including a body of semiconductive material of one conductivity type having a diffused layer of the opposite conductivity type extending inwardly from one surface thereof, the step including bonding a metallic lead and contact assembly to said one surface with said assembly including an areal contact and an elongated lead integral therewith, masking said areal contact, and etching said one surface of said body in the regions adjacent to and underlying said lead with an etchant capable of selectively attacking said semiconductive material to free said lead from said body to thereby provide a lead and contact assembly wherein said areal contact is bonded to said body and said elongated lead projects therefrom.

14. In the manufacture of a semiconductor device including a body of semiconductive material of one conductivity type having a diffused layer of the opposite conductivity type extending inwardly from one surface thereof, the step including bonding a metallic lead and contact assembly to said one surface with said assembly including an areal contact and an elongated lead integral therewith, alloying said areal contact to said body to provide a junction, masking said areal contact, and etching said one surface of said body in the regions adjacent to and underlying said lead with an etchant capable of selectively attacking said semiconductive material to free said lead from said body to thereby provide a lead and contact assembly wherein said areal contact is bonded to said body and said elongated lead projects therefrom.

15. In the manufacture of a semiconductor device including a body of semiconductive material of one conductivity type having a diffused layer of the opposite conductivity type extending inwardly from one surface thereof, the step including bonding a metallic lead and contact assembly to said one surface with said assembly including an areal contact and an elongated lead integral therewith, alloying said areal contact to said body to provide a junction, plating additional metallic material onto said lead and contact assembly, masking said areal contact, and etching said one surface of said body in the regions adjacent to and underlying said lead with an etchant capable of selectively attacking said semiconductive material to free said lead from said body to thereby provide a lead and contact assembly wherein said areal contact is bonded to said body and said elongated lead projects therefrom.

16. A method of manufacturing a semiconductor device comprising the steps of forming a semiconductor body of one conductivity type having a diffused layer of the opposite conductivity type, coating said layer with photosensitive resist material, masking prescribed regions of said coating corresponding to leads and contacts and exposing said coating to a light source to harden the unmasked regions of said coating, removing said coating in said prescribed regions to expose the corresponding regions of said layer, applying a metallic layer on said corresponding regions, removing said coating from said unmasked regions, and removing the portions of the layer of the opposite conductivity type beneath said leads to space said leads from said body.

References Cited in the file of this patent

UNITED STATES PATENTS

| | | |
|---|---|---|
| 2,540,635 | Steier | Feb. 6, 1951 |
| 2,695,852 | Sparks | Nov. 30, 1954 |
| 2,810,870 | Hunter et al. | Oct. 22, 1957 |
| 2,813,326 | Liebowitz | Nov. 19, 1957 |
| 2,836,878 | Shepard | June 3, 1958 |
| 2,882,462 | Zierdt | Apr. 14, 1959 |
| 2,905,873 | Ollendorf et al. | Sept. 22, 1959 |
| 2,912,743 | Gerard | Nov. 17, 1959 |